Dec. 1, 1953     J. S. ROSS     2,660,892
POWER TRAIN FOR VEHICLE POWER TAKE-OFF
SHAFT AND AUXILIARY UNIT
Filed March 1, 1952     3 Sheets-Sheet 1
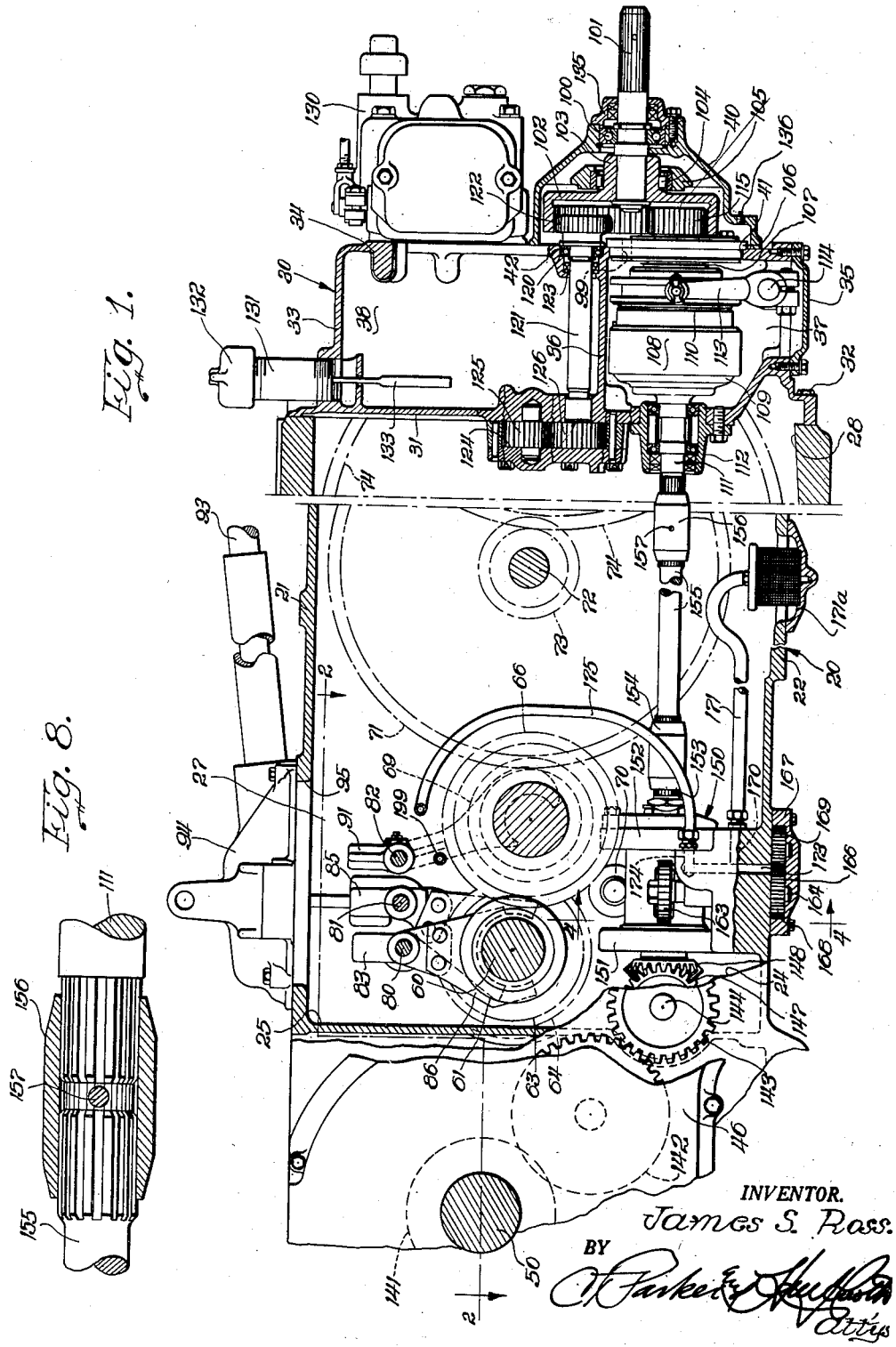
INVENTOR.
James S. Ross.
BY
Parker
Attys

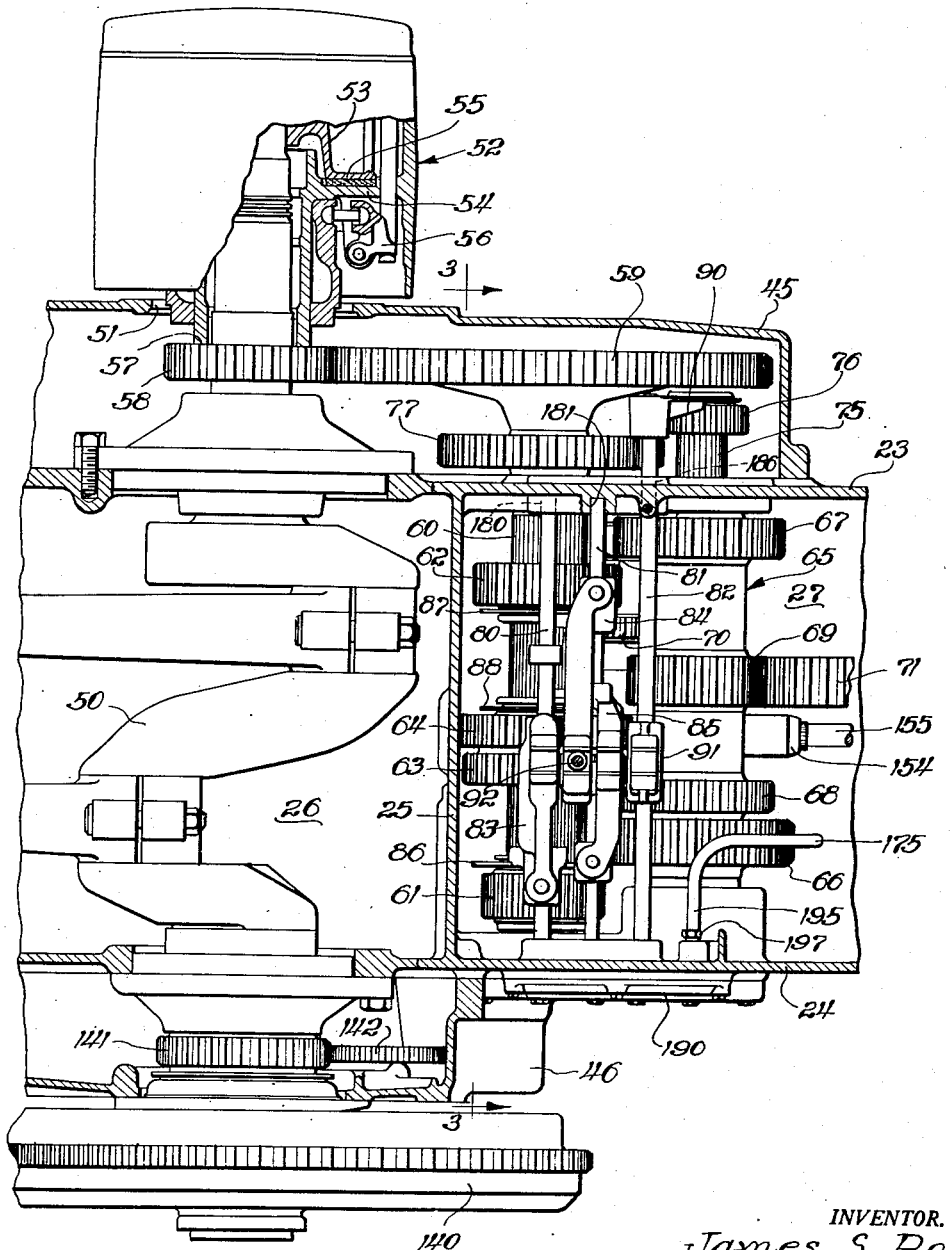

Dec. 1, 1953  J. S. ROSS  2,660,892
POWER TRAIN FOR VEHICLE POWER TAKE-OFF
SHAFT AND AUXILIARY UNIT
Filed March 1, 1952  3 Sheets-Sheet 3
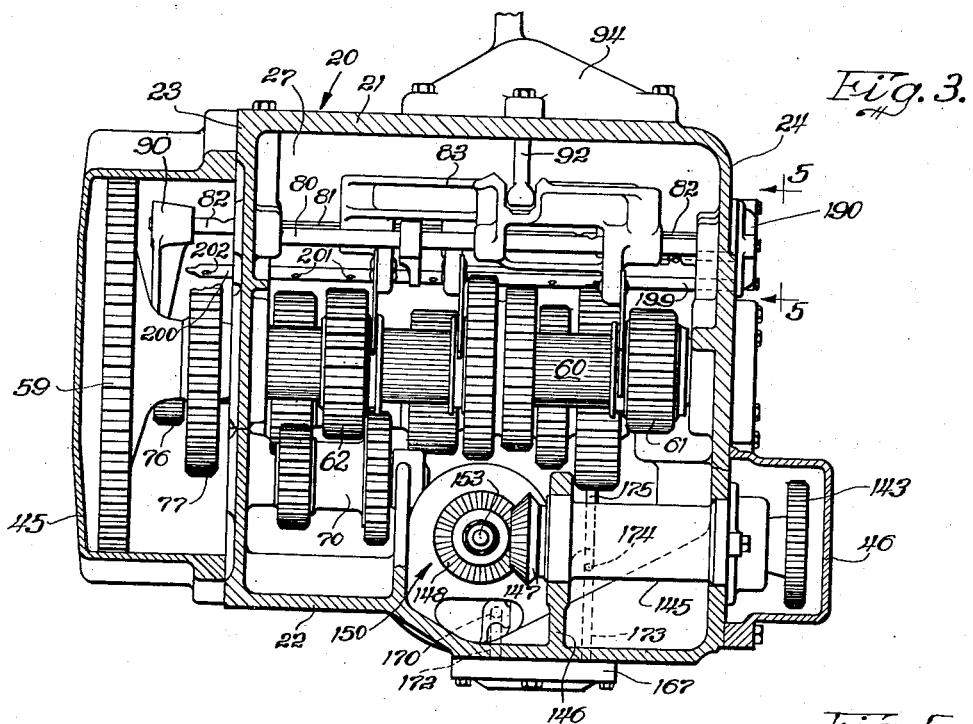
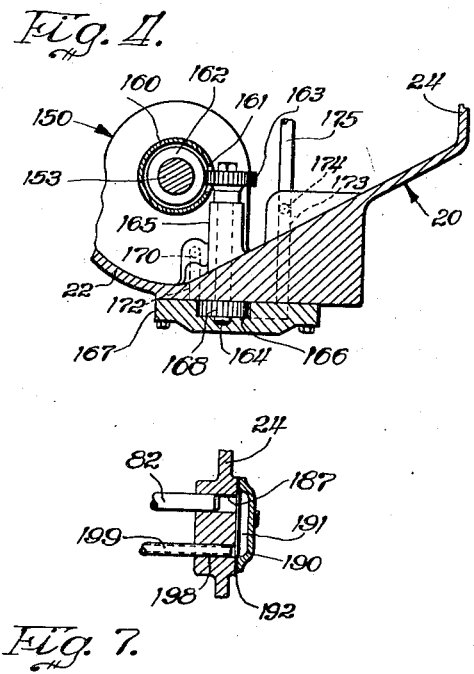
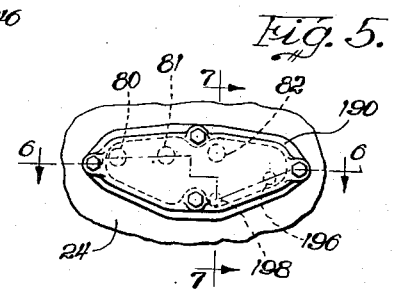
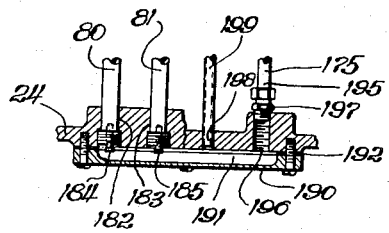
INVENTOR.
James S. Ross.
BY
C. T. Parker and Aufforth
Attys Patented Dec. 1, 1953

2,660,892

UNITED STATES PATENT OFFICE 2,660,892

POWER TRAIN FOR VEHICLE POWER TAKE-OFF SHAFT AND AUXILIARY UNIT

James S. Ross, Waterloo, Iowa, assignor to Deere Manufacturing Co., Dubuque, Iowa, a corporation of Iowa Continuation of application Serial No. 43,736, August 11, 1948. This application March 1, 1952, Serial No. 274,360

15 Claims. (Cl. 74—15.63)

This application is a continuation of my copending application, Serial No. 43,736, filed August 11, 1948, now abandoned, and the invention relates to improvements in vehicles such as agricultural and industrial tractors. More particularly, the invention relates to an improved power train for providing a power take-off with independent clutch control; that is, a power take-off shaft that operates independently of the transmission and final drive mechanism of the vehicle so that power from this shaft will be available at all times when the vehicle engine is running, irrespective of whether the vehicle is in motion.

These power take-offs with independent clutches are basically old and in most cases comprise a shaft connected directly to the engine flywheel or crankshaft. However, the accepted standard R. P. M. for a power take-off shaft is considerably lower than the R. P. M. of the usual tractor or vehicle engine; therefore, some form of gear reduction means must be utilized between the engine and the ultimate point of take-off on the power take-off shaft. In order that the power derived from the power take-off shaft may be adequately controlled, it is desirable to provide some form of clutch between the power take-off shaft and the engine, so that the power take-off shaft may be started and stopped without starting and stopping the engine. The principal object of the invention resides in improved design and construction incorporating several desirable features in a continuously running power take-off shaft.

The modern agricultural tractor has, in addition to the power take-off shaft, a secondary power means which is usually in the form of a hydraulic system including a pump capable of developing fluid pressure in one or more hydraulic cylinder and piston assemblies for the purpose of adjusting implements mounted on or connected to the tractor. According to the present invention, it is a feature to incorporate in the power train means for driving the pump of such hydraulic system. A further object of the invention is to provide the power take-off and hydraulic pump and control assembly as a power unit which may be readily attached to and detached from the tractor. A still further object in this respect is to connect the hydraulic pump to the power shaft, or at least to the power take-off shaft, behind the clutch that connects the power take-off shaft to the engine, whereby the same flexibility of operation and control that obtains with respect to the power shaft may be secured with respect to the hydraulic unit.

A further and none the less important feature of the invention resides in the utilization of the power shaft for the purpose of driving a lubricant pump for lubricating the vehicle transmission. It is a subsidiary object in this respect to connect the lubricant pump to that part of the power shaft that is directly connected to the engine, whereby the lubricant pump will operate at all times irrespective of engagement or disengagement of the power take-off clutch.

Further objects of the invention are: To provide an improved vehicle main body or case construction having several compartments, one for the vehicle transmission, another for the power take-off clutch, another for the reservoir of the hydraulic system, and another for the reduction gear means for the power take-off shaft; to provide improved means for lubricating the vehicle transmission; to provide supporting structure for a longitudinally extending power shaft, the supporting structure for the forward end including a housing which contains the lubricant pump and the supporting structure for the rear end of the shaft including a compartment for housing the power take-off clutch; and to provide generally an improved vehicle construction.

The foregoing and other desirable and important objects and features inherent in and encompassed by the invention will become apparent to those skilled in the art as the disclosure of a preferred form of the invention is made in the following detailed description and accompanying sheets of drawings in which:

Figure 1 is a longitudinal sectional view of the main body or case of a tractor, intermediate rear portions of the construction having been omitted and the view being therefore shortened;

Figure 2 is a fragmentary plan sectional view taken substantially on the line 2—2 of Figure 1;

Figure 3 is a transverse sectional view taken substantially on the line 3—3 of Figure 2 and looking toward the rear of the tractor;

Figure 4 is a fragmentary transverse sectional view taken substantially on the line 4—4 of Figure 1;

Figure 5 is a fragmentary elevational view of that portion of the right side of the main case as viewed along the line 5—5 of Figure 3;

Figure 6 is a fragmentary sectional view taken on the line 6—6 of Figure 5;

Figure 7 is a fragmentary sectional view taken substantially on the line 7—7 of Figure 5; and Figure 8 is an enlarged fragmentary view, partly in section, showing an improved form of drive coupling for interconnecting a pair of coaxial shafts.

In general

The preferred embodiment of the invention illustrated and described here was developed primarily as an improvement in a tractor of the type forming the subject matter of U. S. Patent 1,957,221, issued to H. E. McCray on May 1, 1934. However, although several of the details are peculiar to a tractor of that type, there are other concepts involved that are applicable to vehicles in general. Accordingly, the present disclosure should be taken as illustrative and not as limiting the invention other than as set forth in the appended claims.

Main body or case construction

In a preferred form of the invention, the vehicle includes a longitudinal body comprising a main case designated generally by the numeral 20. This case includes a top wall 21, a bottom wall 22, a right side wall 23, and a left side wall 24. The forward portion of the main case is provided with a transverse vertical wall 25 which separates the forward part of the case into an engine compartment 26 and a change-speed transmission compartment 27. The rear wall of the main case 20 is open, as at 28, and this opening is normally closed by a secondary or attachment casing structure designated generally by the numeral 30. The secondary casing or attachment structure 30 includes a front wall 31 which in effect provides a rear wall for the compartment 27. The casing structure 30 is mountable on and dismountable from the main case 20, as by means of a plurality of cap screws 32, only one of which appears in Figure 1.

The engine compartment 26 normally contains a quantity of suitable lubricant for lubricating the components of the engine. The transmission compartment 27 likewise normally contains a quantity of gear lubricant. The secondary casing or attachment structure 30 is provided with a plurality of walls such as a top wall 33, a rear wall 34 and a removable bottom wall or cover 35. In addition to these walls, the casing structure includes an intermediate or separating wall 36 which divides the casing structure into a first or lower compartment 37 and an upper or second compartment 38. The lower compartment contains lubricant, and the upper compartment is adapted to contain a supply of suitable hydraulic fluid. Further details of the casing structure 30 will appear later.

The casing structure 30 has rigidly secured to the rear wall 34 thereof a gear housing 40 which overlaps the two compartments 37 and 38 to the extent that it overlies a circular opening 41 in the compartment 37 and a smaller circular opening 42 in the upper compartment.

The main body structure further includes at the right hand side thereof an auxiliary casing 45 and at the left side thereof a second auxiliary casing 46, best shown in Figure 2; a portion of the casing 46 is illustrated at the forward part of Figure 1, this casing being broken away to expose, among other things, the forward part of the main case left hand side wall 24.

Transmission and final drive

The tractor illustrated is of the type in which the engine crankshaft is disposed transversely to the longitudinal center line of the main case 20, the crankshaft being designated by the numeral 50 in Figures 1 and 2. The right hand end of the crankshaft extends outwardly through the right hand side wall 22 of the main case, through an aperture 51 in the right hand casing 45 and is provided with a combined belt pulley and main clutch designated generally by the numeral 52. This clutch includes a driving part 53, which is rotatable with the crankshaft 50, and a driven part 54 between which and the driving part 53 there is disposed an appropriate clutch facing 55. The clutch is actuated by control means a portion of which is indicated at 56 and which may be connected by any appropriate means to a suitable control lever or pedal elsewhere on the vehicle. The clutch per se forms no part of the present invention and that illustrated is only representative of many forms that such clutch could assume. A typical clutch, completely illustrated, is shown in the U. S. patent to McCormick 2,103,543.

The driven part 54 of the clutch includes a sleeve 57 which surrounds the right hand end of the crankshaft 50 and which extends within the casing 45. This sleeve has fixed thereto within the casing 45 a driving gear 58 which is in constant mesh with a larger gear 59 disposed rearwardly of the gear 58 and enclosed by the housing or casing 45. The gear 59 is rigidly secured to the right hand end of a transversely extending transmission shaft 60, opposite end portions of the shaft 60 being appropriately journaled in the opposite side walls 23, 24 of the main case 20. The shaft 60 is splined intermediate its ends and carries for rotation therewith but axially slidable thereon a plurality of change-speed gears including first, second, third, and fourth speed gears 61, 62, 63 and 64, respectively. These gears may be shifted selectively into mesh with a plurality of gears fixed in axially spaced relation as components of a countershaft cluster 65 which parallels the transmission shaft 60. The countershaft cluster includes first, second, third and fourth speed fixed gears 66, 67, 68 and 69. The second speed gear 62 is also a reverse gear which may operate in a generally conventional manner through the medium of a reverse idler 70 to reverse the rotation of the countershaft cluster 65.

The fourth speed fixed gear 69 is in constant mesh with a differential driving gear 71 which drives a pair of coaxial, transversely extending differential shafts 72, only one of which appears in the drawings. Each shaft 72 has keyed thereto a bull pinion 73 which is in constant mesh with a bull gear 74, the details of which are represented rather schematically in the shortened illustration in Figure 1. The general relationship between the transmission and final drive mechanism may be obtained from an examination of the McCormick patent mentioned above. The final drive mechanism forms no part of the present invention.

The countershaft cluster 65 is mounted for rotation in unison with a coaxial extension shaft 75 which projects through the right hand side wall 23 of the main case into the casing or housing 45. This extension shaft is axially splined and carries for rotation therewith but for axial shifting thereon a fifth speed shiftable gear 76 which may be shifted into and out of mesh with a fifth speed driving gear 77 fixed to the transmission shaft 60 within the casing 45. Selection of gear ratios in the transmission is obtained by means including a plurality of parallel shifter rails or rods 80, 81, and 82. The rods 80 and 81 are fixed in the side walls 23, 24, of the main case 20 and the first two rods carry slidably thereon shiftable members 83, 84 and 85. There is a single shiftable member 83 on the rod 80 which has a shifter fork 86 operable to shift the first speed shiftable gear 61. The two shiftable members 84 and 85 are on the second shifter rod 81; the shiftable member 84 has a shifting fork 87 which is operable to shift the second speed and reverse gear 62. The member 85 has a shifter fork 88 for accomplishing shifting of the third and fourth speed gears 63 and 64.

Shifting of the shiftable fifth speed gear 76 is accomplished by means of a shifter fork 90 fixed to the right hand end of the slidable shift rod 82 within the casing 45. A shifting member 91 is fixed to an intermediate portion of the shifter rod 82 in longitudinal alignment with the central portions of the shiftable members 83, 84 and 85. All four members 83, 84, 85 and 91 are selectively operable by means of a shifter arm 92 which may be controlled from a point remote from the transmission by means of a longitudinally rearwardly extending shifter shaft 93 carried in a cover 94 secured over an opening 95 in a forward portion of the upper main case wall 21, as best shown in Figure 1. The details of the transmission per se form no part of the present invention, but the operation and general design thereof have been briefly illustrated for the purpose of enabling ready identification of the transmission components.

*Power unit-power take-off and hydraulic system*

As previously stated, the power unit attachment or casing structure 30 includes the compartments 37 and 38 and the compartment provided by the housing 40. The housing 40 is provided at its rear with a circular opening within which is carried an anti-friction bearing 100 for the journaling of a power take-off shaft 101, the external end of which is splined for the purpose of enabling driving connection with implements or other accessories to be driven by the power take-off shaft. That portion of the shaft 101 within the housing 40 is provided with a driving member in the form of an internal gear 102 which has a hub 103 journaled in a suitable anti-friction bearing 104 mounted in a web 105 of the housing 40, the unit comprising the shaft 101 and gear 102 being thus appropriately journaled in the bearings 100 and 104.

The housing 40 is essentially a lubricant-containing compartment and the circular opening 41 in the compartment 37 is normally closed by a circular member 106 which may be provided with a suitable bearing (not shown) for journaling a rotatable member such as a shaft 107. The shaft 107 may be considered part of a clutch, designated generally by the numeral 108, comprising a driving part 109 and a driven part 110 to which the shaft 107 is fixed for rotation. The driving part 109 is preferably formed integrally with or otherwise secured to a forwardly extending shaft part 111 which is journaled in a pair of axially spaced bearings carried in a bearing sleeve 112 which is in turn rigidly carried by the lower portion of the front wall 31 of the unit 30. The clutch 108 may be of any appropriate construction and the details thereof are not important, since they form, per se, no part of the present invention. The compartment 37 contains lubricant at a level into which the periphery of the clutch may dip to a limited extent and the dividing wall 34—106 may be provided with an opening 99 (Figure 1) by means of which lubricant carried up by the clutch 108 may enter the compartment in the housing 40. The operation of the clutch 108 is accomplished by means including a control arm 113 and rockshaft 114. The rockshaft preferably extends outside the compartment 37, at which point it may be suitably connected to any appropriate control means, the details of which are not important here.

The rear end portion of the shaft 107 extends through the circular member 106 and into the compartment of the housing 40 and has fixed thereto for rotation therewith a relatively small external gear 115 which is in constant mesh with the internal gear 102 on the inner end of the power take-off shaft 101. It will be noted that the shafts 101 and 107 have their axes parallel but radially offset.

The circular opening 42 in the rear wall 34 of the upper compartment 38 is fitted with a suitable anti-friction bearing 120 within which is journaled one end of a shaft 121. This shaft is above and parallels the common axis of the shaft parts 107 and 111 and has its rear end extending into the compartment provided by the housing 40. The rear end of the shaft 121 has keyed or otherwise secured thereto for rotation therewith a relatively small internal gear 122 which is in constant mesh with the internal gear 102. It will thus be seen that the gears 115 and 122, although in generally the same plane, are in non-meshing relationship. The gears 115 and 122 are substantially of the same size and will therefore have substantially the same R. P. M.

The compartment 38 is for the purpose of containing a quantity of suitable hydraulic fluid. For this reason, the shaft 122 is appropriately sealed, as at 123. The forward end of the shaft 121 extends through the forward wall 31 of the unit 30 into a pump chamber, designated generally by the numeral 124. The pump chamber includes a pair of pump gears 125, 126, the latter being fixed to the forward end of the shaft 121.

The upper portion of the rear wall 34 of the unit 30 has rigidly mounted thereon a hydraulic control housing 130, which may be of any conventional construction, although preferably of the type shown in assignee's co-pending application, Serial No. 626,626, filed November 5, 1945. The compartment 38 provides a reservoir for the hydraulic system of which the control housing 130 is a part, and fluid pressure is developed for use in the hydraulic system by means of the fluid pump comprising the gears 125, 126 in the pump housing 124. The upper wall 33 of the unit 30 is provided with a vertical pipe 131 normally closed by a removable cover 132 which includes a check stick 133 to be used in observing the liquid level in the compartment or reservoir 38.

From the description thus far of the unit 30, it will be seen that the unit includes a pair of auxiliary driven means, one being the power take-off shaft 101 and the other being the hydraulic control unit 130 and pump shaft 121 therefor. The housing 40 overlaps the two compartments 37 and 38 in such manner as to enclose the gears 115 and 122, this result obtaining primarily from the offset relationship of the shaft 101 with respect to the shafts 107 and 121. The compartments 37 and 38 are separated by the separating wall 36 and the former is appropriately sealed off from the forward compartment 27 and the compartment provided in the housing 40. In addition, the compartment 38 is sealed at 123 against loss of hydraulic fluid into the compartment of the housing 40. The housing 40 may be enclosed at its rear by an appropriate sealing means 135 through which the splined end of the power take-off shaft 101 extends. The housing 40 is provided with a drain plug 136 by means of which lubricant may be drained from that compartment. The cover 35 at the bottom of the unit may be removed to provide for access to the front compartment 37. The entire unit 30 may be removed and the rear opening 28 in the main case may be closed by a simple cover in the event that the substitution of such cover for the unit 30 is found desirable or expedient.

*Auxiliary power train*

As previously stated, the left side of the main case 20 is provided with a secondary casing 46. The left hand end of the crankshaft 50 projects through the left hand side wall 24 and through the casing 46, having keyed at its outer end a flywheel 140. Within the casing 46, the left hand end of the crankshaft 50 has keyed thereto a driving gear 141 which is in mesh with a second gear 142. This second gear is in constant mesh with a third or driven gear 143, best shown in Figures 1 and 3. In Figure 1, the left hand side wall of the casing 46 has been broken away to expose the gear 143. This gear and the left hand side wall 24 have been additionally broken away to expose the interior of the transmission compartment 27.

The shaft 143 is keyed to the left hand end of a short transverse shaft 144 which is appropriately journaled in a short sleeve 145 positioned within the transmission compartment 27 and appropriately carried in the left hand side wall 24 and in a supporting web 146. The inner end of the shaft 144 has keyed thereto a bevel pinion 147 which is in constant mesh with a second bevel pinion 148 rotatable on a longitudinal axis.

The forward bottom portion of the main case 20 is provided within the compartment 27 with housing or supporting structure, designated generally by the numeral 150, best shown in Figure 1. This housing or supporting structure includes a pair of axially spaced apart bearings 151 and 152 within which is journaled a longitudinally extending short shaft 153, the forward end of which is keyed to the bevel pinion 148 and the rearward end of which is splined and connected by a coupling or connector sleeve 154 to the splined forward end of a longitudinally extending power transmitting shaft part 155.

As previously stated, the shaft 111, which is fixed to the driven part of the power take-off clutch 108, extends forwardly and is splined. The shaft parts 111, 153 and 155 are coaxial. The rear end of the power-transmitting shaft 155 is splined and the proximate ends of the shaft parts 155 and 111 are drivingly interconnected by a sleeve connecter or coupling 156, the details of which are best shown in Figure 8. In this figure, it will be noted that the proximate ends of the coaxial shafts 111 and 155 are closely spaced apart and that the coupling 156 interconnects the two shaft parts for rotation in unison. In the normal position of the coupling as shown, the coupling bridges the space or gap between the proximate ends of the shafts 111 and 155. The connection of the shaft parts by the coupling 156 for rotation in unison is accomplished by an internal spline in the coupling, so that the coupling is axially shiftable but non-rotatable with respect to the shaft parts 111 and 155. In this respect, it is a feature of the invention to provide an improved coupling means for interconnecting the two shaft parts. To this end, there is provided between the coupling and the shaft parts means normally preventing axial shifting of the coupling with respect to the shaft parts. This means preferably takes the form of a member or pin 157 which is passed diametrically through the sleeve or coupling 156 between the proximate ends of the shaft parts, the sleeve being diametrically drilled in an appropriate manner to accommodate the pin. When the pin 157 is in position, as shown, it and the proximate ends of the shaft parts serve as interengaging abutments to prevent the coupling from shifting axially in either direction. The sleeve or coupling 154 is similarly constructed and has the same function with respect to the shaft parts 155 and 153. The construction described has the advantage of simplicity and economy of manufacture, since no special operations are required on the shaft parts 111, 153 or 155 and it is only the coupling 156 (154) that needs to be drilled to accommodate the pin 157.

From the description of the power train thus far, it will be seen that the driving means carried through the power transmitting shaft 155 is entirely independent of the clutch connection between the engine-driven member (crankshaft) and the change-speed transmission. Engagement or disengagement of the engine clutch 52 has no effect on the operation of the power transmitting shaft 155 or the components connected thereto. This arrangement enables power to be obtained at the power take-off shaft 101 as long as the crankshaft 50 is being driven by the engine, irrespective of whether or not the vehicle is set in motion by selection of a gear ratio in the transmission. However, the power take-off shaft 101 may be disconnected from the power transmitting means including the shafts 153—155—111 by means of disengagement of the clutch 108, without effecting starting or stopping of the engine. Likewise, since the hydraulic pump 125—126 is driven from the gear 102 on the power take-off shaft 101, the hydraulic system may be operated as long as the vehicle engine is running, irrespective of whether or not the vehicle is in motion; and, further, disengagement of the clutch 108 will discontinue operation of the hydraulic pump.

The particular design of the present tractor does not permit of a simple direct gear reduction between the engine crankshaft 50 and the forward end of the power transmitting shaft means 153—155—111. For example, it will be readily apparent that the simple expedient of two gears between the crankshaft 50 and short transverse shaft 144 could not be adopted in view of space limitations.

In view of the fact that the operating R. P. M. of a conventional tractor engine is roughly between 1000 and 2000 R. P. M. and the desirable or standard speed of a power take-off shaft should be between 500 and 600 R. P. M., it is necessary that a reduction be obtained somewhere in the power train. According to the present invention, the reduction is obtained at the driving connection between the shaft 107 and the power take-off shaft 101; that is to say, the appropriate reduction is obtained through the use of the internal gear 102 and the smaller external gear 115. Thus, the reduction is appropriately contained in the unit 30, rather than in the main components of the tractor, thus contributing to the flexibility of the tractor from the standpoint of production under a plan in which the tractor may be manufactured with or without the attachment 30. Inasmuch as the gear reduction is in the unit 30, no alterations need be made to a tractor originally supplied without the unit but subsequently equipped with the unit.

Although it is necessary to have a lower R. P. M. for the power take-off shaft 101, it is desirable that the R. P. M. of the hydraulic pump be somewhat higher. In the present case, the higher R. P. M. is obtained between the shaft 101 and gear 102 by meshing of the gear 102 with the smaller external gear 122 on the rear end of the shaft 121; thus, the shaft 121 is driven substantially at the speed of the power transmitting shaft 153—155—111. Again, the provision of the gear reduction means in the attachment 30 contributes materially to the desirability of the attachment or unit. At the same time, it should be noted that the same driving or gear means is utilized to obtain a step-down in R. P. M. for the power take-off shaft 101 and a step-up in R. P. M. for the pump shaft 121. The connection of the pump shaft 121 to the power take-off shaft 101 within the housing 40 leaves the outer end of the power take-off shaft 101 available for universal use, contrary to some prior constructions in which the hydraulic system is driven as an attachment to the external part of the power take-off shaft.

*Transmission lubricant pump*

The forward housing or journal 150 for the short longitudinal shaft 153 includes an intermediate sleeve portion 160 (Figure 4) from which a wall portion is cut out to provide an opening 161. Within the sleeve 160, the shaft 153 carries for rotation therewith a worm gear 162 which is in constant mesh with a worm wheel or gear 163 keyed to the upper end of a short vertical shaft 164. The shaft 164 is journaled in an upright sleeve 165 preferably formed integral with the bottom 22 of the main case 20, and the shaft extends downwardly through the bottom wall 22 of the main case into a pump chamber 166 (Figures 1 and 4) formed by a cover member 167 which is removably secured to the bottom 22 of the main case. Within the pump chamber 166, the lower end of the shaft 164 has keyed thereto a pump gear 168 which is in constant mesh with a second pump gear 169 (Figure 1).

The housing or journal 150 is provided with a short horizontal bore 170 which has its rear end opening to the lower portion of the transmission compartment 27, at which point it is connected to a rearwardly extending inlet tube 171 (Figure 1). The tube 171, being located at a lower portion of the main case 20 is thus appropriately located to lie immersed in a lubricant sump 171a contained in the transmission compartment 27. The forward end of the longitudinal horizontal bore 170 intersects a vertical bore 172 which extends downwardly and communicates with the pump chamber 166, thus providing an oil intake for the pump gears 168 and 169. The discharge outlet from the pump chamber 166 is provided by a second and longer vertical bore 173 which is spaced laterally toward the left hand side wall 24 of the main case 20. This vertical bore 173 communicates at its upper end with a rearwardly extending horizontal bore 174 and the latter is connected at its rear end to a rearwardly and upwardly extending lubricant supply tube 175, the purpose of which is to convey lubricant to upper parts of the transmission, as will presently appear.

*Shifter rail mounting*

As previously described, the three shifter rails 80, 81 and 82 extend transversely between the right and left side walls 23 and 24 of the main case above the transmission shaft and gears. The right hand ends of the rails 80 and 81 are carried respectively in recesses 180 and 181 in the right hand side wall 24; of course, the right hand ends of the rails 80 and 81 may be otherwise fixed against displacement to the right. As best shown in Figure 6, the left hand ends of the rails 80 and 81 are received respectively in a pair of bores 182 and 183 in the left hand side wall 24 of the main case. Suitable locking means, as at 184, 185, respectively, are provided for securing the rails 80 and 81 rigidly in place in the main case.

Although the rails 80 and 81 are fixed in the main case, the third rail 82 is laterally slidable in the case, the right hand side wall being provided with a bore 186 (Figure 2) for slidably receiving the right hand end portion of the rail 82, and the left hand side wall 24 of the main case being provided with an aligned bore 187 (Figure 7) for carrying the right hand end of the rail 82.

The upper portion of the left hand main case side wall 24 removably carries an enclosure member or cover 190 which completely encloses the right hand end of the third or slidable shifter rail 82 and the locking means 184, 185 for the first two rails 80 and 81. The cover 190 is interiorly recessed to provide a pocket 191 and the joint between the cover 190 and the right hand main case side wall 24 is lubricant- and dust-tight, preferably including a suitable gasket 192.

*Lubricant supply system*

As previously stated, the rearwardly extending tube 171 is immersed in the lubricant sump provided by the lower portion of the transmission compartment 27. By means of this inlet tube 171, the lubricant pump 168, 169 takes in lubricant and discharges lubricant upwardly through the bores 173 and 174 to the discharge or supply tube 175. As best shown in Figures 1 and 2, the tube 175 curves rearwardly and upwardly about the first speed fixed gear 66 and then curves forwardly and toward the left hand main case side wall 24, as at 195, at which point it communicates with a bore 196 formed in the left hand side wall 24 and communicating with the pocket 191 provided in the cover 190 (Figure 6). The connection between the portion 195 of the tube 175 and the bore 196 is accomplished by any suitable fitting, as at 197. Thus, the tube 175 serves to keep the pocket 191 filled with lubricant at all times when the pump 168, 169 is working properly. Further, the cover 190 serves not only to exclude dust from the end of the shifter rods 80, 81 and 82 but serves to contain a supply of lubricant which lubricates the left hand end of the slidable shifter rod 82.

In addition to the inlet bore 196, the left hand main case side wall 24 is provided with a second bore 198 (Figures 5, 6 and 7) which communicates with the lubricant pocket 191 at a point below and forwardly of the bore 196. The bore 198 receives the left hand end of a transverse lubricant supply tube 199 which extends across the transmission compartment, passing through the right hand main case side wall 23 and into the compartment provided by the casing 45, the right hand end of the tube 199 being visible at 200 in Figure 3. The tube 199 is provided with a plurality of perforations or orifices 201 spaced lengthwise thereof (Figure 3). These perforations are preferably provided in the tube 199 at points above the transmission gears. The right hand end 200 of the tube 199 is preferably pinched to close the same and a perforation 202 is provided for the purpose of supplying lubricant to the fifth speed gears 76 and 77, a portion of the gear 77 being broken away in Figure 3 to expose the right hand end of the tube.

Since the lubricant pump 168, 169 is connected to the shaft 153, which is in turn connected directly to the engine-driven shaft 144, the pump will operate at all times that the engine is operating. In other words, operation of the lubricant pump 168, 169 is independent of the power take-off clutch 108. Further, it will be noted that the speed of operation of the pump 168, 169 is not affected by the gear reduction for the power take-off shaft 101. The lubricant pump will thus supply a constant volume of lubricant at a fairly high pressure to the lubricant pocket 191 in the cover 190. Since the perforations 201 and 202 are relatively small, the supply of lubricant to the pocket 191 will exceed somewhat the discharge of lubricant through the perforations to the transmission gears, wherefore the pocket 191 will contain lubricant at a level sufficient to lubricate the right hand end of the fifth speed shifter rail 82.

The forced supply of lubricant to the transmission gears is particularly desirable in a design as presently illustrated, wherein the transmission gears are spaced upwardly from the main case bottom 22 to allow for the mounting of the longitudinal power-transmitting shaft 153—155. The particular type of lubricating system and shifter rod mounting disclosed forms the subject matter of asignee's co-pending application, Serial No. 50,258, filed September 21, 1948, and has been shown and described here only as representing one form of system with which the pump 168—169 may be used.

Summary

From the foregoing description, it will be seen that the invention provides, in a vehicle such as a tractor or the like, an auxiliary power train for driving several auxiliary means independently of the transmission and final drive mechanism for the vehicle. In the present instance, the auxiliary means comprises the power take-off, the hydraulic pump, and the lubricant pump. These three units are connected by means of the power transmitting shaft 153—155—111 to the engine and are driven by the engine independently of engagement or disengagement of the engine clutch between the engine and the transmission, wherefore these units may be operated by the engine irrespective of whether or not the vehicle is in motion. Further, it will be noted that the lubricant pump 168, 169 is independent of the power take-off clutch 108, thus providing for continued operation of the lubricant pump at all times when the engine is running, which is important inasmuch as the transmission shaft 60 and sliding gears thereon will be driven by the engine as long as the main clutch 52 is engaged, irrespective of whether or not the transmission is in neutral.

The desirability of the provision of the casing or housing structure 30 as a unit attachment has been covered above and needs no elaboration. Various other features of the invention have likewise been covered above and other and subsidiary features will undoubtedly be recognized by those versed in the art. It will be realized, of course, that the present disclosure is based upon a preferred form of the invention as adapted to a tractor of the particular type referred to. However, the invention is capable of numerous modifications and alterations, all of which may be made without departing from the spirit and scope of the invention as defined in the appended claims.

What is claimed is:

1. In a vehicle having a longitudinal body, an engine-driven member at a forward portion of the body, a change-speed transmission rearwardly of the engine-driven member, and clutch means selectively connectible and disconnectible between the engine-driven member and the change-speed transmission, the improvement comprising: a first power shaft part journaled in the body and directly connected to the engine-driven member independently of the change-speed transmission and extending longitudinally rearwardly from said engine-driven member and rearwardly beyond the change-speed transmission; a second power shaft part coaxial with and disposed rearwardly of the first power shaft part; clutch means selectively connectible and disconnectible between said power shaft parts; a power take-off shaft offset from and disposed rearwardly of the second power shaft part and extending rearwardly of the vehicle body; gear means interconnecting the second shaft part and the power take-off shaft, including a relatively small external gear fixed to the second power shaft part and a larger internal gear fixed to the power take-off shaft and in constant mesh with said smaller gear; first auxiliary driven means carried by the body and including a rotatable part; means drivingly interconnecting said auxiliary driven means and the power take-off shaft, including an external gear fixed to the rotatable part of the auxiliary driven means and in constant mesh with the internal gear on the power take-off shaft; second auxiliary driven means carried by the body including a lubricating pump adjacent the change-speed transmission and having means for supplying lubricant to the transmission; and driving means operatively interconnecting said pump and the first power shaft part.

2. In a vehicle having a longitudinal body, an engine-driven member at a forward portion of the body, a change-speed transmission rearwardly of the engine-driven member, and clutch means selectively connectible and disconnectible between the engine-driven member and the change-speed transmission, the improvement comprising: a first power shaft part journaled in the body and directly connected to the engine-driven member independently of the change-speed transmission; a second power shaft part coaxial with the first power shaft part; clutch means selectively connectible and disconnectible between said power shaft parts; a power take-off shaft offset to one side of the second power shaft part; gear means interconnecting the second shaft part and the power take-off shaft, including a relatively small external gear fixed to the second power shaft part and a larger internal gear fixed to the power take-off shaft and in constant mesh with said smaller gear; first auxiliary driven means carried by the body and including a rotatable part; means drivingly interconnecting said auxiliary driven means and the power take-off shaft, including an external gear fixed to the rotatable part of the auxiliary driven means and in constant mesh with the internal gear on the power take-off shaft; second auxiliary driven means carried by the body including a lubricating pump adjacent the change-speed transmission and having means for supplying lubricant to the transmission; and driving means operatively interconnecting said pump and the first power shaft part.

3. In a vehicle having a longitudinal body, an engine-driven member at a forward portion of the body, a change-speed transmission rearwardly of the engine-driven member and clutch means selectively connectible and disconnectible between the engine-driven member and the change-speed transmission, the improvement comprising: a first power shaft part journaled in the body and directly connected to the engine-driven member independently of the change-speed transmission; a second power shaft part coaxial with the first power shaft part; clutch means selectively connectible and disconnectible between said power shaft parts; a power take-off shaft offset to one side of the second power shaft part; gear means interconnecting the second shaft part and the power take-off shaft, including a relatively small external gear fixed to the second power shaft part and a larger internal gear fixed to the power take-off shaft and in constant mesh with said smaller gear; auxiliary driven means carried by the body and including a rotatable part; and means drivingly interconnecting said auxiliary driven means and the power take-off shaft, including an external gear fixed to the rotatable part of the auxiliary driven means and in constant mesh with the internal gear on the power take-off shaft.

4. In a vehicle having a longitudinal body, an engine-driven member at a forward portion of the body, a change-speed transmission rearwardly of the engine-driven member, and clutch means selectively connectible and disconnectible between the engine-driven member and the change-speed transmission, the improvement comprising: a first power shaft part journaled in the body and directly connected to the engine-driven member independently of the change-speed transmission and extending longitudinally rearwardly from said engine-driven member and rearwardly beyond the change-speed transmission; a second power shaft part coaxial with and disposed rearwardly of the first power shaft part; clutch means selectively connectible and disconnectible between said power shaft parts; a power take-off shaft offset from and disposed rearwardly of the second power shaft part and extending rearwardly of the vehicle body; gear means interconnecting the second shaft part and the power take-off shaft, including a gear fixed to the second power shaft part and a gear fixed to the power take-off shaft and in constant mesh with said first gear; first auxiliary driven means carried by the body and including a rotatable part; means drivingly interconnecting said auxiliary driven means and the power take-off shaft, including a gear fixed to the rotatable part of the auxiliary driven means and in constant mesh with the gear on the power take-off shaft; second auxiliary driven means carried by the body including a lubricating pump adjacent the change-speed transmission and having means for supplying lubricant to the transmission; and driving means operatively interconnecting said pump and the first power shaft part.

5. In a vehicle having a longitudinal body, an engine-driven member at a forward portion of the body, a change-speed transmission rearwardly of the engine-driven member, and clutch means selectively connectible and disconnectible between the engine-driven member and the change-speed transmission, the improvement comprising: a first power shaft part journaled in the body and directly connected to the engine-driven member independently of the change-speed transmission; a second power shaft part coaxial with the first power shaft part; clutch means selectively connectible and disconnectible between said power shaft parts; a power take-off shaft offset to one side of the second power shaft part; gear means interconnecting the second shaft part and the power take-off shaft, including a gear fixed to the second power shaft part and a gear fixed to the power take-off shaft and in constant mesh with said first gear; first auxiliary driven means carried by the body and including a rotatable part; means drivingly interconnecting said auxiliary driven means and the power take-off shaft, including a gear fixed to the rotatable part of the auxiliary driven means and in constant mesh with the gear on the power take-off shaft; second auxiliary driven means carried by the body including a lubricating pump adjacent the change-speed transmission and having means for supplying lubricant to the transmission; and driving means operatively interconnecting said pump and the first power shaft part.

6. In a vehicle having a longitudinal body, an engine-driven member at a forward portion of the body, a change-speed transmission rearwardly of the engine-driven member, and clutch means selectively connectible and disconnectible between the engine-driven member and the change-speed transmission, the improvement comprising: a power take-off shaft carried by the body and including an internal portion and an external portion as respects the body; fluid-pressure power means carried by the body and including a pump; a lubricant pump carried by the body and having means for supplying lubricant to the transmission; a power-transmitting shaft directly connected to the engine-driven member independently of the change-speed transmission; driving means interconnecting said power-transmitting shaft and the internal portion of the power take-off shaft; second driving means interconnecting said power-transmitting shaft and the fluid-pressure power means; and third driving means interconnecting said power-transmitting shaft and the lubricant pump.

7. In a vehicle having a longitudinal body, a power take-off shaft carried by the body at a rear portion thereof and including an internal portion and an external portion as respects the body; fluid-pressure power means carried by the body adjacent the power take-off shaft and including a pump; a lubricant pump carried by the body at a forward portion thereof and having means for supplying lubricant to the transmission; a power-transmitting shaft extending longitudinally of the body; driving means interconnecting a rear portion of said power-transmitting shaft and the internal portion of the power take-off shaft; second driving means interconnecting a rear portion of said power-transmitting shaft and the fluid-pressure power means; and third driving means interconnecting a forward portion of said power-transmitting shaft and the lubricant pump.

8. In a vehicle having a longitudinal body provided with a rearwardly extending power shaft: a power unit attachment comprising a casing having front, rear, side, top, bottom and intermediate walls providing a pair of side-by-side compartments adapted for positioning at the rear of the vehicle body; driving means in the lower compartment including a clutch having a driving shaft connectible to the vehicle power shaft and a driven shaft extending through the casing rear wall; a rotatable shaft in the upper compartment paralleling the driven shaft and projecting through the casing rear wall; first and second non-meshing external gears fixed respectively to the rear ends of the upper compartment shaft and the lower compartment driven shaft; a housing secured to the rear wall of the casing and enclosing said gears; a power take-off shaft journaled in said housing and paralleling but non-coaxial with said driven and upper compartment shafts; and an internal gear enclosed by said housing and fixed to the power take-off shaft and in constant mesh with both of said external gears.

9. In a vehicle having a body and a power shaft rotatable therein: a power unit attachment for mounting on the body and for connection to said shaft, comprising a casing having a plurality of walls providing first and second separate compartments; drive means in the first compartment including a shaft having at one end means for driving connection to the vehicle power shaft and disposed with its other end extending outside the first compartment; an external gear fixed to said other end of the first shaft; a second shaft in the second compartment parallel to the first shaft and having an end projecting outside the second compartment and proximate to the gear on the first shaft; an external gear fixed to said outside end of the second shaft in the plane of but not meshing with the first gear; a housing carried by the casing and enclosing said gears; a power take-off shaft journaled in the housing on an axis offset radially from but paralleling the first and second shaft axes; and an internal gear fixed to the power take-off shaft within the housing and in constant mesh with the gears on the first and second shafts.

10. In a vehicle having a body and a power shaft rotatable therein: a power unit attachment for mounting on the body and for connection to said shaft, comprising a casing having a plurality of walls providing a first compartment and a second compartment; drive means in the first compartment including a clutch having a driving part connectible to the vehicle power shaft and a driven part comprising a first shaft having an end portion extending outside said first compartment; a gear fixed to said outside end portion of the first shaft; a second shaft rotatable in the second compartment and having an end portion projecting outside said second compartment in proximity to the gear on the first shaft; a gear fixed to said end portion of the second shaft out of mesh with the first shaft gear; a housing carried by the casing and enclosing said gears and adapted to contain lubricant; a power take-off shaft journaled in said housing; and gear means, including a gear fixed to the power take-off shaft within the housing, connecting the first and second shaft gears and the power take-off shaft.

11. In a vehicle: a longitudinal body including a compartment; change-speed transmission means in said compartment; a longitudinal power shaft in the body extending forwardly into and extending rearwardly from said compartment and spaced from the transmission means in a direction transverse to the length of the body; means carried by the body at a forward portion thereof, including a housing within said compartment and journaling the forward end of the power shaft; a lubricant pump in said housing including drive means directly connected to the power shaft and having means for supplying lubricant to the transmission compartment; and means at a rear portion of the body journaling the rear end of the power shaft, including a second housing; a clutch in said second housing having a driving part fixed to the rear end of the power shaft, and a driven part including a shaft extending outside said second housing.

12. In a power take-off mechanism, housing structure including a first housing portion having a shaft journaled therein with one end of said shaft extending through and beyond one wall of said first housing portion, an element in said first housing portion connected to said shaft for rotation therewith, a driven gear rotatably mounted relative to said shaft and element and adapted for meshing engagement with an external drive gear, means for selectively connecting said element and driven gear for rotation in unison, a hydraulic pump carried by the housing structure and having a pumping element, said housing structure including a second housing portion enclosing the pumping element and a third housing portion disposed in covering relation to said one end wall of said first housing portion and in covering relation to said one end of said shaft, pump drive means mounted on said one end portion of said shaft for rotation therewith and being operatively associated with said pumping element, and external power take-off means deriving power from said shaft when said element and driven gear are connected for rotation in unison.

13. In a power take-off mechanism, housing structure including a first housing portion journalling a shaft with one end of the shaft adjacent to an end wall of said first housing portion, an element in the first housing portion connected to the shaft for rotation therewith, a driving member coaxial with and rotatable relative to the shaft and element and adapted for driving engagement with a source of power, means for selectively connecting the driving member and the element for rotation in unison, said housing structure including a second housing portion disposed in covering relation to said one end wall of the first housing portion and to said one end of the shaft, a hydraulic pump carried by the housing structure and provided with a pumping element, pump drive means mounted on said one end of the shaft for rotation therewith and operatively associated with the pumping element, and power take-off means external to the housing structure and deriving power from the shaft when the element and driving member are connected for rotation in unison.

14. In a power take-off mechanism, housing structure including a first housing portion having a support, a shaft journaled in the first housing portion and having one end extending beyond the support, an element in the first housing portion connected to the shaft for rotation therewith at the other side of the support, a driving member journaled in the housing portion and rotatable relative to the shaft and element and adapted for driving engagement with a source of power, means for selectively connecting the driving member and the element for rotation in unison, said housing structure including a second housing portion enclosing said support of the first housing portion and said one end of the shaft, a hydraulic pump carried by the housing structure and provided with a driven pumping element, a driving pumping element connected to said one end of the shaft for rotation therewith and enclosed by the second housing portion, drive means operatively associated with the driven pumping element and the driving pumping element, and power take-off means external to the housing structure and having a drive connection projecting into one of the housing portions for deriving power from the shaft when the element and driving member are connected for rotation in unison.

15. In a power take-off mechanism, a first housing having a shaft journaled therein with one end of said shaft extending through and beyond one wall of said housing, an element in said housing connected to said shaft for rotation therewith, a gear rotatably mounted relative to said shaft and adapted for meshing engagement with an external drive gear, means for selectively connecting said element and gear for rotation in unison, a hydraulic pump comprising a housing portion enclosing a pumping element and disposed in covering relation to said one end wall of said first housing in covering relation to said one end of said shaft, pump drive means mounted on said one end portion of said shaft for rotation therewith and being operatively associated with said pumping element, and external power take-off means deriving power from said shaft when said element and gear are connected for rotation in unison.

JAMES S. ROSS.

References Cited in the file of this patent

UNITED STATES PATENTS

| Number | Name | Date |
|---|---|---|
| 2,582,466 | Strehlow | Jan. 15, 1952 |